United States Patent [19]

Dijkmans

[11] Patent Number: 5,270,633
[45] Date of Patent: Dec. 14, 1993

[54] TERNARY ENERGY SUPPLY CIRCUIT WITH A HIGH FREQUENCY REJECTION FILTER

[75] Inventor: Eise C. Dijkmans, Eindhoven, Netherlands

[73] Assignee: U.S. Philips Corporation, New York, N.Y.

[21] Appl. No.: 774,025

[22] Filed: Oct. 8, 1991

[30] Foreign Application Priority Data

Oct. 11, 1990 [NL] Netherlands ............... 9002212

[51] Int. Cl.⁵ .............................. H02P 5/40
[52] U.S. Cl. .................... 318/810; 318/807
[58] Field of Search ........... 318/811, 807, 810, 283, 318/285, 254, 138; 328/14, 60, 165, 70, 158

[56] References Cited

U.S. PATENT DOCUMENTS 3,649,922  3/1972  Ralph et al. .................. 328/14

FOREIGN PATENT DOCUMENTS 2558571  7/1977  Fed. Rep. of Germany .
244189  12/1985  Japan .
244190  12/1985  Japan .
244191  12/1985  Japan .

*Primary Examiner*—William M. Shoop, Jr.
*Assistant Examiner*—John W. Cabeca
*Attorney, Agent, or Firm*—Bernard Franzblau

[57] ABSTRACT

An arrangement for supplying energy to a load having a low-pass frequency characteristic. A binary signal having a low-frequency component and a strong high-frequency component having a predetermined frequency is applied to a rejection filter adjusted to suppress the predetermined frequency. The rejection filter is of a type producing a ternary output signal.

The load is supplied by means of a control circuit in such a way that, in response to the signal level at the output of the rejection filter, the load is supplied with a positive polarity, with a negative polarity, or the energy supply to the load is interrupted. In this manner a ternary energy supply is obtained having low power dissipation in the control circuit and in the load.

16 Claims, 4 Drawing Sheets

TERNARY ENERGY SUPPLY CIRCUIT WITH A HIGH FREQUENCY REJECTION FILTER

BACKGROUND OF THE INVENTION

This invention relates to an arrangement for supplying energy to a load dependent upon a binary signal comprising a low-frequency component and a strong high-frequency component having a predetermined frequency which, load has a low-pass frequency characteristic. In a first energy supply state the arrangement is arranged to supply energy to the load by means of an electric quantity with a specific polarity, in a second energy supply state it supplies energy to the load by means of an electric quantity with a polarity opposite to the specific polarity and, in a third energy supply state it interrupts the energy supply to the load. The arrangement comprises a control circuit for alternately causing the arrangement to adopt different energy supply states according to a switching pattern determined by the binary signal.

The invention likewise relates to a drive system comprising such an arrangement disposed to energize an exciter coil of a motor of the drive system.

The invention further relates to a sound reproduction system comprising the above arrangement adapted to energize an electroacoustic converter.

A drive system of the type mentioned above is known, for example, from DE-OS 25 58 571.

In the prior art drive system a dc motor is supplied with energy by means of a so-called H-bridge in which, in a first energy supply state, the motor is energized by a dc voltage source through two diagonally opposite switches in the H-bridge. In the second energy supply state the motor is energized by the same dc voltage source through two different diagonally opposite switches of the H-bridge. In the third energy supply state the motor is short-circuited by means of two switches of the H-bridge. The control circuit receives two pulse-width modulated binary signals which are each other's inverse value apart from a mutual phase shift. The phase shift is such that the ascending edge of one binary signal coincides with the descending edge of the other binary signal. The switch control signals for causing the H-bridge to adopt one of the three energy supply states are derived from these two binary signals. In the case where the two binary signals exhibit different signal values, the H-bridge is brought to the first or the second energy supply state depending on the sign of the difference between these signals. If the signal values of the two binary signals are equal, the H-bridge is made to adopt the third energy supply state in which the supply is interrupted. In this manner the motor is energized with a current largely determined by the dc voltage component of the binary signal, so that the power dissipation produced in the motor and switches by the high-frequency component of the binary signal is reduced considerably relative to an energy supply with pulse-width modulated operating voltages, while no use is made of the third energy supply state. The drawback of the prior art arrangement is, however, that deriving the control signals which denote this third energy supply state is extremely complex.

SUMMARY OF THE INVENTION

It is an object of the invention to provide an arrangement of the type mentioned in the preamble in which control signals for a reduced dissipation drive are derived with simple means.

This object is achieved, according to the invention, in that the control circuit comprises a rejection filter having a ternary output signal, which filter is adjusted to the frequency of the strong signal component, and in that the three different output signal values determine the three energy supply states.

The invention is also based on the recognition that the power dissipation is largely caused by the strong high-frequency component in the supply pattern, which component corresponds at least to a single high-frequency component in the binary signal. This component can easily be removed with the aid of the rejection filter.

An embodiment of the invention very attractive in its simplicity is characterized in that the rejection filter is a first order filter, comprising a delay circuit for delaying the binary signal and a signal processing circuit for deriving from the two binary signals an output signal which is indicative of the sum of the two binary signals.

This embodiment uses to advantage the fact that rejection filters of this type produce a ternary output signal so that the control signals can be derived from the output signals in an extremely simple manner.

The arrangement according to the invention is suitable for control circuits deriving energy supply states from a binary pulse-width modulated signal and also for control circuits deriving the three energy supply states from a pulse-density modulated signal in which the positions of successive pulses are mutually shifted an integer number of uniform time intervals.

In the latter type of control circuit the distance between the low-frequency component of the frequency spectrum and the strong high-frequency component is considerably larger than for the former type of control circuit. This is advantageous in that the high-frequency component in the energy supply of the load is strongly suppressed.

The arrangement according to the invention is very suitable for energizing exciter coils of motors in control systems. If the control system relates to a feedback digital control system, the energy supply arrangement in combination with the exciter coil operates as a digital-to-analog converter, which greatly simplifies controlling the exciting motor from the digital control circuit.

The arrangement according to the invention is also suitable for energizing an electroacoustic converter in a sound reproduction system wherein the audio information is available in digital form, for example, for reading a so-called compact disc or a so-called digital audio tape cassette.

BRIEF DESCRIPTION OF THE DRAWING

Further embodiments of the invention as well as advantages thereof will be described hereinbelow with reference to the accompanying drawing FIGS. 1 to 12, in which.

DESCRIPTION OF THE PREFERRED EMBODIMENTS

When a load having a low-pass frequency characteristic is supplied with energy, the load is often supplied with a high-frequency binary supply voltage having a low-frequency component and a high-frequency component. Due to the low-pass nature of the frequency characteristic, the current to flow through the load will mainly be determined by the low-frequency component of the supply voltage.

Figure 1:
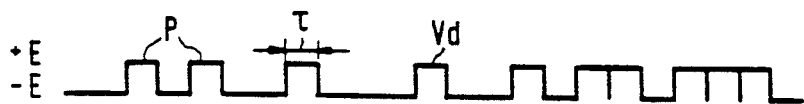
FIGS. 1 and 2 show examples of binary signals having a low-frequency component and a strong high-frequency component having a predetermined frequency value.
Figure 2:
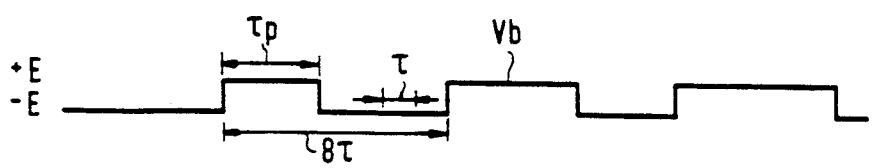
Figure 4A:
FIGS. 4 and 5 show a plurality of signals and associated frequency spectrums in explanation of the invention.

Suitable binary values for supplying energy to the load are, for example, a binary pulse-density modulated signal Vd as is represented in FIG. 1, or a pulse-width modulated signal Vb as is represented in FIG. 2. The frequency spectrums of the respective signals Vd and Vb are given as illustrative examples in FIGS. 4 and 5. The signals Vd and Vb have two signal levels, that is to say, $+E$ and $-E$. The signal Vd comprises a number of constant-width pulses, while successive pulses p are mutually shifted an integer number of uniform time intervals $\tau$. The dc voltage component of the signal Vd is determined by the number of pulses per unit of time. In addition to a low-frequency component the signal comprises a strong high-frequency component having a frequency $\frac{1}{2}\tau$. By way of illustration FIG. 4d shows the low-frequency component Hld and the strong high-frequency component Hhd plotted against frequency. It should be observed that in FIG. 4d the frequency component Hld is shown having only a single frequency. In reality the low-frequency component Hld has a spectrum of frequencies. The pulse-width modulated signal represented in FIG. 5a has a pulse repetition rate of $\frac{1}{8}\tau$. The width $\tau p$ of the pulse p' may assume a number of different values. In the represented example the pulses may assume eight different discrete widths, that is to say, $1\tau, 2\tau, \ldots, 8\tau$. The dc voltage component of the signal Vlb is determined by the ratio of pulse-width $\tau p$ to the duration of the time interval $8\tau$. This ratio is often denoted by the English term duty cycle. In addition to the low-frequency component, the signal Vlb includes a strong high-frequency component having a frequency $\frac{1}{8}\tau$. By way of illustration the low-frequency component Hlb of the signal Vlb and the high-frequency, component Hhb are plotted against frequency f in FIG. 5d.

Figure 5A:
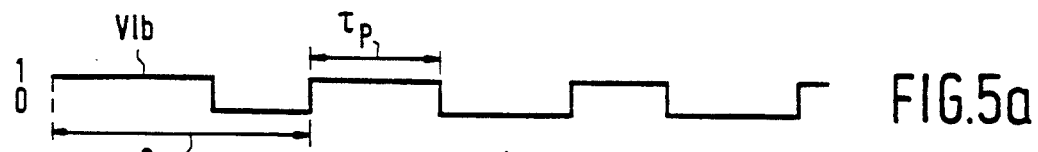
Figure 5B:
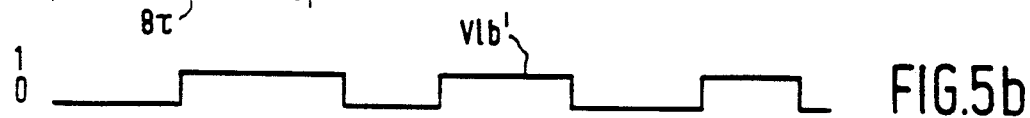
Figure 5C:
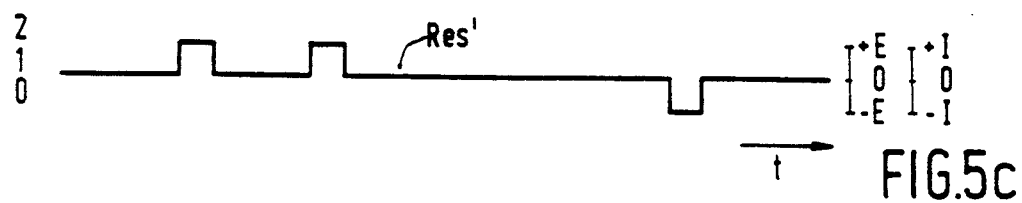
Figure 5D:
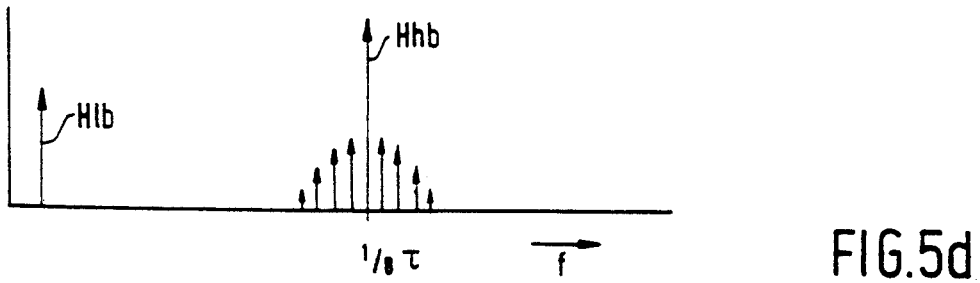

It should be observed that in FIG. 5d the frequency component Hlb is shown to have only one frequency. In reality the low-frequency component has a spectrum of frequencies.

As observed above, the high-frequency component has only a very limited effect on the strength of the current through a load when the load is supplied with energy via the above binary signals. This high-frequency component results in a high-frequency current component having a relatively low amplitude. This current component, however, does cause unnecessary dissipation in the load. This dissipation may be reduced considerably by supplying the load with a ternary signal in which the high-frequency component is greatly suppressed.

Figure 3:
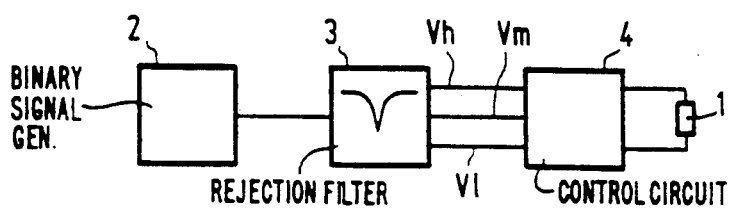
FIG. 3 shows an embodiment of the arrangement according to the invention.

An arrangement according to the invention with which a load 1 is supplied with energy via a ternary signal is represented in FIG. 3. The arrangement comprises a signal generation circuit 2 generating a pulse-width or pulse-density modulated logic signal having two distinguishable logic levels 0 and 1. A suitable pulse-density modulated logic signal Vld is represented in FIG. 4a and a suitable pulse-width modulated logic signal Vlb is represented in FIG. 5a. The signals Vld and Vlb are similar to Vd and Vb, respectively. The logic signal generated by the signal generation circuit 2 is applied to a rejection filter 3 adjusted to suppress the strong high-frequency signal component in the logic signal. The rejection filter 3 produces a ternary signal. A high signal level is then represented by an output signal Vh, an intermediate level is represented by an output signal Vm and a low level is represented by output signal Vl. The output signals Vh, Vm and Vl are applied as control signals to a control circuit 4 to which the load 1 is connected. The control circuit 4 is of a type made to adopt an energy supply state in response to the current signal Vh in which state the load 1 is supplied with energy by means of an electric quantity with a first polarity. In response to the control signal Vl the load 1 is energized by means of an electric quantity with a polarity opposite to the first polarity. In response to the control signal Vm the energy supply to the load is interrupted.

Figure 6:
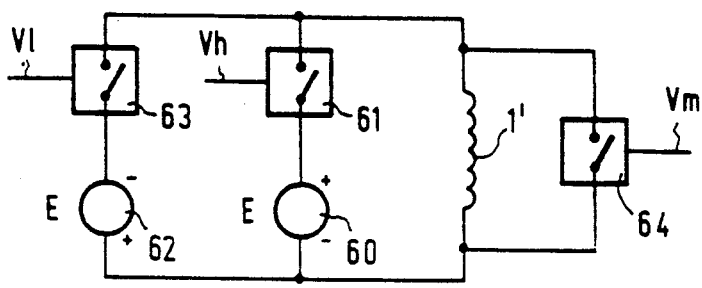
FIGS. 6, 7 and 8 show different embodiments of the control circuit to be used in the arrangement according to the invention.

FIG. 6 shows a first embodiment of the control circuit 4 for supplying energy to an inductive load 1', for example, an exciter coil of a motor or electroacoustic converter. The load 1' is connected to a voltage source 60 by means of a switch 61 responsive to the signal Vh. The load 1' is connected to a voltage source 62 by means of a switch 63 responsive to the control signal Vl. The voltage of the voltage source 60 is such that when the switch 61 is closed, the load is energized with a voltage $+E$. The voltage of the voltage source 62 is opposite to that of the voltage source 60 so that the load is energized with a voltage $-E$ when switch 63 is closed.

Furthermore, the control circuit shown in FIG. 6 comprises another switch 64 controlled by the control signal Vm for short-circuiting the load 1'.

Contingent on which of the signals Vh, Vl or Vm is produced by the rejection filter, the load will be supplied with a voltage $+E$, a voltage $-E$ or will be short-circuited, respectively. Thus, the load 1' is supplied with a ternary signal in accordance with the output signals of the filter 3.

Figure 7:
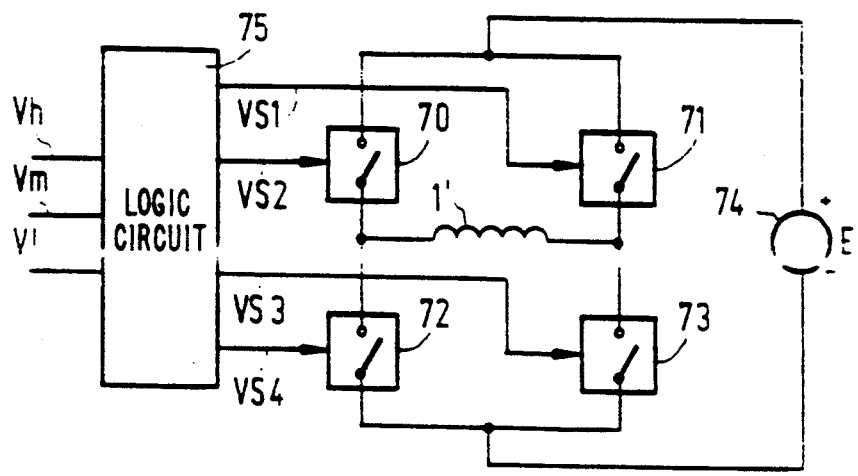

A second embodiment of the control circuit for supplying energy to the inductive load 1' is shown in FIG. 7. This control circuit comprises a so-called H-bridge formed by a first circuit comprising a series combination of two switches 70 and 72 connected to a voltage source 74, and a second circuit comprising a series combination of switches 71 and 73 likewise connected to the voltage source 74. The switches 70, . . . , 73 are responsive to four control signals Vs1, . . . , Vs4 derived from the control signals Vh, Vm and Vl by means of a suitable logic circuit 75. The logic circuit 75 is of a customary type which generates, in response to the control signals Vh, the control signals Vs2 and Vs3 for closing the switches 70 and 73. The logic circuit generates, in response to the control signal Vl, the control signals Vs1 and Vs4 for closing the switches 71 and 72 and generates, in response to the control signal Vm the control signals Vs3 and Vs4 for closing the switches 72 and 73. In this manner the load 1' is again supplied with a ternary voltage having the voltage levels +E, −E and 0, which levels correspond to the ternary output signal of the rejection filter 3.

Figure 8:
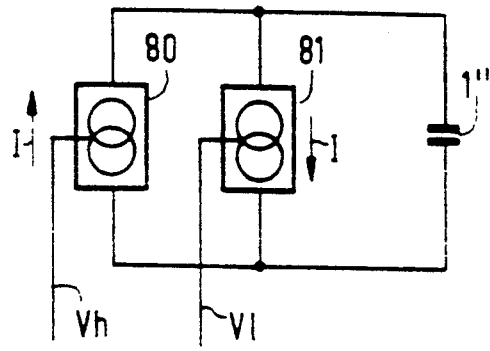

FIG. 8 shows an embodiment of the control circuit 4 for supplying energy to a capacitive load 1" from two controllable current sources 80 and 81 having an amplitude I. The current sources 80 and 81 are connected in parallel across the load 1", while the polarities of the current sources are opposite.

The current sources 80 and 81 are controlled by the respective output signals Vh and Vl. In this fashion the load 1" is supplied with a ternary supply current having the current values +I, −I and 0, which supply current corresponds to the ternary output signal of the rejection filter 3.

The rejection filter used may basically be any rejection filter. In the case where the number of signal levels at the output exceeds three, this output signal can be converted into a ternary signal by implementing customary quantization techniques. Preferably, however, a rejection filter is used consisting of a delay element for delaying the input signal and a signal processing circuit, for example, an adder, which derives from the input signal and the delayed input signal signals denoting that the two input signals have a logic value 1, a logic value 0 or that the logic values of the two input signals are unequal.

Figure 9:
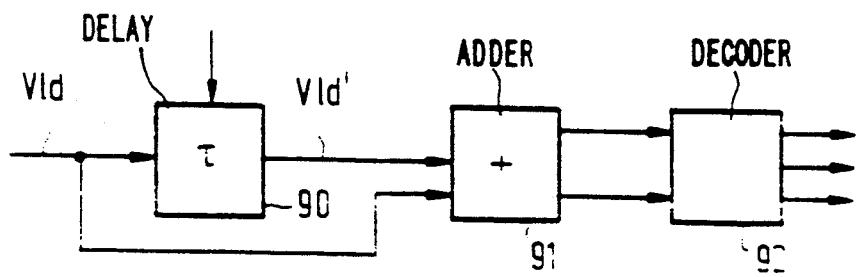
FIGS. 9 and 10 show two different embodiments of the rejection filters to be used in the arrangement according to the invention.

FIG. 9 shows an embodiment of the rejection filter 3 for eliminating the strong high-frequency component Hhd in the pulse-density modulated signal Vld. The filter comprises a delay element 90 for delaying the input signal Vld over the time interval $\tau$. Although basically any delay element having a delay $\tau$ may be used, the delay element 90 preferably comprises a flip-flop which is controlled in synchronism with the input signal Vld by means of a clock signal at a rate of $1/\tau$. The delay element 90 applies a delayed signal Vld' to an adder circuit 91 where the delayed signal Vld' is added to the signal Vld. The result of the addition performed by the adder circuit 91 is a ternary signal represented by a 2-bit output signal Vop.

Figure 4B:
Figure 4C:
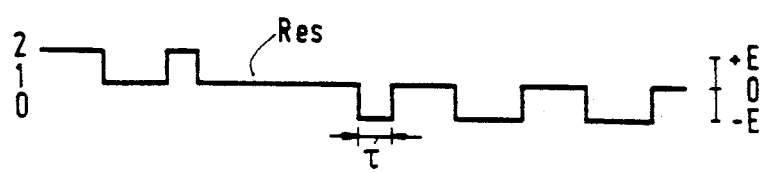
Figure 4D:
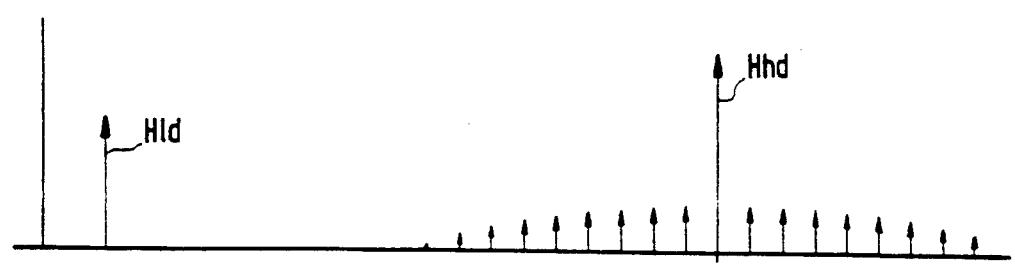

By way of illustration, FIGS. 4b and 4c show the delayed signal Vld' and the result Res of the addition represented by the signal Vop, plotted against time. In the result Res, the high, intermediate and low signal levels are to be distinguished by the respective levels 0, 1 and 2. With a so-called 4-out-of-2 decoder 92 the 2-bit signal is converted into the signals Vh, Vm and Vl. When the control circuits shown in FIGS. 6 and 7 are used for the energy supply, the three levels 0, 1, 2 correspond to the supply voltages −E, 0, +E. When energy is supplied with the aid of the control circuit shown in FIG. 8, the three levels 0, 1, 2 correspond to the supply currents −I, 0, +I. With the combination of the rejection filter shown in FIG. 3 and the control circuit 4, the binary pulse-density signal Vld is converted into a ternary supply signal from which the high-frequency component having a frequency $1/\tau$ is eliminated. This avoids unnecessary dissipation due to this frequency component, both in the control circuit 4 and in the load 1.

In the rejection filter shown in FIG. 9 the three control signals Vl, Vm and Vh are derived from the signals Vld and Vld' by means of a combination of the adder circuit 91 and a 4-out-of-2 decoder 92. However, it will be obvious to the person skilled in the art that this derivation can also be performed with different logic circuits, for example, with gate circuits generating the signals Vh, Vm and Vl for the different combinations of logic values of the signals Vld and Vld'.

Figure 10:
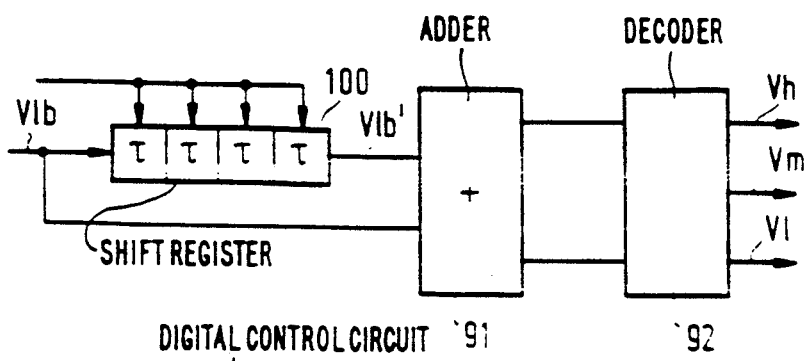

FIG. 10 shows an embodiment of the rejection filter for elimination of the frequency component Hhb having a frequency $\frac{1}{4}\tau$ in the pulse-width modulated signal Vlb. This embodiment comprises a delay element 100 for delaying the signal Vlb over a time interval $4\tau$. The delay element 100 preferably comprises a shift register controlled in synchronism with the signal Vlb by means of a clock signal having a frequency $1/\tau$.

From the signals Vlb' and Vlb delayed by element 100, the control signals Vh, Vm and Vl are derived with the aid of the adder circuit 91 and the 4-out-of-2 decoder 92 in a similar fashion to that of the embodiment in FIG. 9.

By way of illustration, FIGS. 5b and 5c show the delayed signal Vlb' and the result Res' of the addition of Vlb and Vlb', plotted against time t. The result Res' again corresponds to the ternary supply signal obtained by means of the control circuit 4 in response to the signals Vh, Vm and Vl. From this ternary signal the frequency component having the frequency $\frac{1}{4}\tau$ is eliminated so that the dissipation in the load 1 and the control circuit 4 induced by the frequency component Hhb in the binary pulse-width modulated signal Vlb is avoided.

The energy supply arrangement according to the invention is preeminently suitable for energizing exciter coils of motors in position-servo systems such as, for example, a track-following servo system to be used in optical record and detection devices. In such systems the motor is disposed around a central position, which means that the motor is supplied with relatively low supply voltages. Without the strong high-frequency component being filtered, the contribution of this component to the overall energy dissipated in the motor is large.

Figure 11:
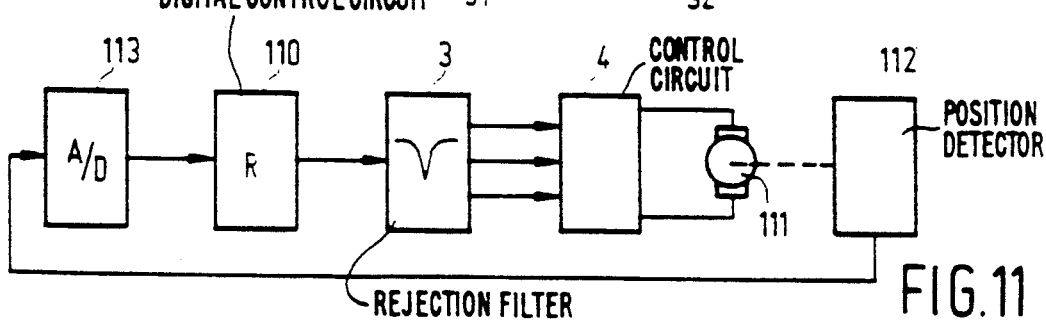
FIG. 11 shows a servo system with a motor drive system comprising an arrangement according to the invention.

FIG. 11 shows an embodiment of a servo system comprising an energy supply arrangement according to the invention. In this system a digital control circuit 110 generates the pulse-width or pulse-density modulated signals Vlb or Vld, respectively. In response thereto the rejection filter 3 and the control circuit 4 produce a ternary supply signal for the load in the form of a motor 111. A measuring device 112 determines the motor position. The determined position is digitized with the aid of an analog-to-digital converter 113 and is applied to the digital control circuit 110. The control circuit 110 derives therefrom in a customary fashion the binary signal Vlb or Vld control of the motor energy supply. The use of the supply arrangement in a digital servo control has the additional advantage that the supply circuit operates as a digital-to-analog converter so that a 1-bit digital output signal of the control circuit 110 can immediately be used for controlling the energy supply arrangement.

Figure 12:
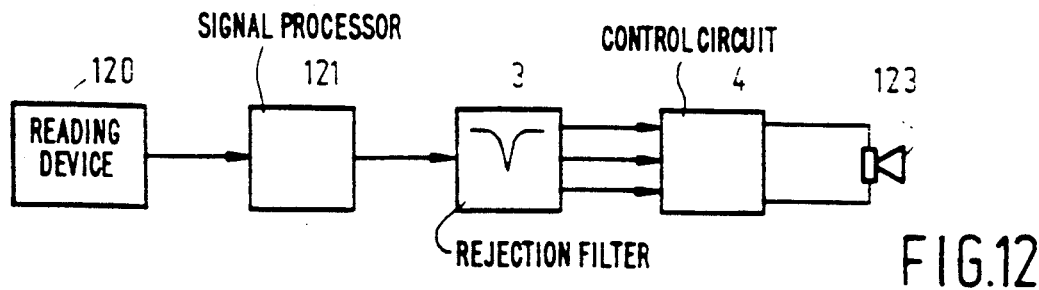
FIG. 12 shows a sound reproduction system comprising the arrangement according to the invention.

The energy supply arrangement is also pre-eminently suitable for energizing an electroacoustic converter in a sound reproduction system. An embodiment of a sound reproduction system comprising an energy supply arrangement according to the invention is represented in FIG. 12. The depicted sound reproduction system comprises a reading device 120 for reading a record carrier, for example, a so-called Compact Disc or Digital Audio Tape on which audio information is recorded in digital form. The information read is applied to a signal processing unit 121 for the digital information signal read to be converted into a binary pulse-width or pulse-density modulated signal, whose low-frequency component represents the audio information. If the binary signal produced by the signal processing unit 121 is pulse-density modulated, the signal processing unit may be one of a customary type producing a stream of 1-bit digital signal samples. On the basis of the binary signal produced by the signal processing unit 121 the combination of a rejection filter 3 and a control circuit 4 may generate a corresponding ternary supply signal for an electroacoustic converter 123, for example, of a customary type which is used in a headphone.

In this application the elimination of the high-frequency component of the supplied signal additionally provides the advantage of minimum high-frequency disturbances in the reproduced audio signal, which results in a high reproduction quality of the audio information. In the foregoing the invention has been described for applications in which the ternary supply signal is derived from a pulse-density or pulse-width modulated binary signal.

However, it should be observed in this context that the application in which the ternary supply signal is obtained in response to a pulse-density modulated signal is to be preferred. For that matter, the disturbing high-frequency components in the pulse-density modulated signals are considerably lower than those in the pulse-width modulated signals, which implies that the effect of the non-eliminated frequency components, for example, the frequency component having twice the frequency of the eliminated component, is reduced more strongly and therefore results in smaller disturbances.

I claim:

1. An arrangement for supplying energy to a load in response to a binary signal including a low-frequency component and a strong high-frequency component having a predetermined frequency, said load having a low-pass frequency characteristic, the arrangement being operative, in a first energy supply state, to supply energy to the load by means of an electric quantity with a specific polarity, in a second energy supply state being operative to supply energy to the load by means of an electric quantity with a polarity opposite to the specific polarity and, in a third energy supply state being operative to interrupt the energy supply to the load, the arrangement comprising a control circuit for alternately causing the arrangement to adopt different energy supply states according to a switching pattern determined by the binary signal, characterized in that the control circuit comprises a rejection filter deriving a ternary output signal having three different output signal values and with the filter adjusted to suppress the predetermined frequency of the strong high-frequency signal component, and in that the three different output signal values determine the three energy supply states.

2. An arrangement as claimed in claim 1, wherein the rejection filter is a first order filter comprising a delay circuit for delaying the binary signal and a signal processing circuit for deriving from the binary signal and a delayed binary signal an output signal which is indicative of the sum of the binary and delayed binary signals.

3. An arrangement as claimed in claim 1, which arrangement comprises signal generating means for generating the binary signal in the form of a pulse-density modulated signal in which the positions of successive pulses are mutually shifted an integer number of uniform time intervals, and wherein the rejection filter includes a delay circuit having a delay which corresponds to said uniform time interval.

4. A motor drive system comprising a motor having a driving coil and an arrangement as claimed in claim 1 for supplying energy to the drive coil.

5. A motor drive system as claimed in claim 4, wherein the system comprises a measuring device for deriving a signal defined by the position of the motor, a converter for digitizing the derived signal, and wherein the drive system further comprise digital controlling means for deriving the binary signal from a derived digitized signal.

6. A sound reproduction system comprising an electroacoustic converter and an arrangement as claimed in claim 1 for supplying energy to the electroacoustic converter.

7. An arrangement as claimed in claim 2, which arrangement comprises signal generating means for generating the binary signal in the form of a pulse-density modulated signal in which the positions of successive pulses are mutually shifted an integer number of uniform time intervals, and wherein the delay of the delay circuit corresponds to said uniform time interval.

8. An arrangement as claimed in claim 1, wherein the load comprises a drive coil of a motor.

9. An arrangement as claimed in claim 1, wherein the load comprises an electroacoustic converter of a sound reproduction system.

10. An energy supply circuit for a load having a low-pass frequency characteristic, said supply circuit comprising:
   means for generating a binary signal having a low frequency component and a high frequency component of a given frequency,
   a control circuit including means for supplying electric energy of a first polarity to the load in a first energy supply state of the supply circuit, means for supplying electric energy to the load of a second polarity opposite to the first polarity in a second energy supply state of the supply circuit, and means for interrupting the supply of electric energy to the load in a third energy supply state of the supply circuit,
   a rejection filter coupled in cascade between the binary signal generating means and the control circuit for deriving a ternary control signal determined by the binary signal, said filter being adapted to suppress said given frequency of the high frequency component, and wherein
   the control circuit is responsive to said ternary control signal to produce the first, second and third energy supply states for the load as a function of a switching pattern determined by the binary signal.

11. A supply circuit as claimed in claim 10, wherein the rejection filter comprises:
   a delay circuit having its input connected to an output of the binary signal generating means and an output coupled to a first input of an adder circuit,
   said adder circuit having a second input directly coupled to the output of the binary signal generating means and an output coupled to an input of a decoder, and wherein
   the decoder derives from output signals of the adder circuit said ternary control signal.

12. A supply circuit as claimed in claim 11, wherein said binary signal generating means produces a pulse-density modulated binary signal in which successive pulses are mutually shifted an integer number of uniform time intervals, and wherein the delay circuit produces a time delay which corresponds to the uniform time interval.

13. A supply circuit as claimed in claim 10, wherein the load comprises a drive winding of an electric motor.

14. A supply circuit as claimed in claim 10, wherein the load comprises an electroacoustic converter of a sound reproduction system.

15. A supply circuit as claimed in claim 10, wherein the control circuit comprises:

a logic circuit having first, second and third inputs for receiving respective ones of the ternary control signals and having first, second, third and fourth outputs for supplying first, second, third and fourth switching signals, respectively, determined by the binary signal switching pattern, first, second, third and fourth switching devices connected in a bridge circuit with the load connected to output terminals of the bridge circuit and with a DC voltage source coupled to input terminals of the bridge circuit, and means for coupling said first, second, third and fourth switching signals to respective control terminals of the first, second, third and fourth switching devices, respectively.

16. An energy supply circuit for a load having a low-pass frequency characteristic, said supply circuit comprising:

means for generating a single binary signal having a low frequency component for energizing the load and an undesired high frequency component of a given frequency, a control circuit including means for selectively supplying to the load electric energy of a first polarity, of a second polarity opposite to the first polarity, and for interrupting the supply of electric energy to the load, a rejection filter coupled in cascade between the binary signal generating means and the control circuit for deriving a ternary control signal determined by the binary signal, said filter being adapted to suppress said given frequency of the high frequency component, and wherein the control circuit is responsive to said ternary control signal to supply energy to the load of the first polarity, the second polarity, or for interrupting the energy to the load as a function of a switching pattern determined by the binary signal.

* * * * *